(12) United States Patent
Williamson

(10) Patent No.: US 8,150,879 B2
(45) Date of Patent: Apr. 3, 2012

(54) BUILDING CUSTOM DIMENSION TREES

(75) Inventor: Eric J. Williamson, Fuquay Varina, NC (US)

(73) Assignee: Red Hat, Inc., Raleigh, NC (US)

( * ) Notice: Subject to any disclaimer, the term of this patent is extended or adjusted under 35 U.S.C. 154(b) by 539 days.

(21) Appl. No.: 12/202,077

(22) Filed: Aug. 29, 2008

(65) Prior Publication Data
US 2010/0057764 A1    Mar. 4, 2010

(51) Int. Cl.
*G06F 17/30* (2006.01)
(52) U.S. Cl. ........ 707/791; 707/802; 707/805; 707/821; 707/829
(58) Field of Classification Search .................. 707/600, 707/802, 999.003, 791, 805, 821, 829
See application file for complete search history.

(56) References Cited

U.S. PATENT DOCUMENTS

| | | | |
|---|---|---|---|
| 5,657,437 A | 8/1997 | Bishop et al. | |
| 5,819,273 A | 10/1998 | Vora et al. | |
| 5,850,388 A | 12/1998 | Anderson et al. | |
| 6,092,050 A * | 7/2000 | Lungren et al. | 705/35 |
| 6,581,068 B1 | 6/2003 | Bensoussan et al. | |
| 6,775,675 B1 * | 8/2004 | Nwabueze et al. | 707/600 |
| 7,181,422 B1 | 2/2007 | Philip et al. | |
| 7,181,438 B1 * | 2/2007 | Szabo | 707/999.002 |
| 7,441,197 B2 | 10/2008 | Tschiegg et al. | |
| 7,631,020 B1 | 12/2009 | Wei et al. | |
| 7,639,609 B2 | 12/2009 | Bolt et al. | |
| 7,698,349 B2 * | 4/2010 | Hulen et al. | 707/805 |
| 7,800,613 B2 * | 9/2010 | Hanrahan et al. | 345/440 |
| 7,801,929 B2 | 9/2010 | Williamson | |
| 8,019,679 B2 | 9/2011 | Bennett et al. | |
| 2001/0054034 A1 | 12/2001 | Arning et al. | |
| 2002/0183965 A1 | 12/2002 | Goglak | |
| 2003/0217074 A1 * | 11/2003 | Wallace | 707/104.1 |
| 2004/0153435 A1 * | 8/2004 | Gudbjartsson et al. | 707/1 |
| 2005/0044079 A1 * | 2/2005 | Abineri et al. | 707/10 |
| 2005/0080802 A1 | 4/2005 | Cras et al. | |
| 2005/0091206 A1 | 4/2005 | Koukerdjinian et al. | |
| 2005/0192963 A1 | 9/2005 | Tschiegg et al. | |
| 2006/0004830 A1 | 1/2006 | Lora et al. | |
| 2006/0031110 A1 | 2/2006 | Benbassat et al. | |
| 2006/0112070 A1 * | 5/2006 | Ramos | 707/1 |
| 2007/0055596 A1 | 3/2007 | Yankovich et al. | |

(Continued)

OTHER PUBLICATIONS

Adam Shapiro, Analysis Services: Choosing Dimension Types in SQL Server 2000 Analysis Services, Jul. 19, 2001, pp. 1-15.*

(Continued)

*Primary Examiner* — Charles Rones
*Assistant Examiner* — Rezwanul Mahmood
(74) *Attorney, Agent, or Firm* — Lowenstein Sandler PC

(57) ABSTRACT

A method and apparatus for creating custom dimension trees. The method may include receiving a user request to create a custom dimension tree, displaying a list of available dimensions, and receiving user selection of available dimensions from the list. The method may further include allowing the user to create virtual dimensions, mapping elements of the available dimensions to the virtual dimensions, and creating the custom dimension tree using the mapping. The custom dimension tree represents relationships between the virtual dimensions.

20 Claims, 9 Drawing Sheets

U.S. PATENT DOCUMENTS

| | | | |
|---|---|---|---|
| 2007/0156677 A1* | 7/2007 | Szabo | 707/5 |
| 2007/0156718 A1 | 7/2007 | Hossfeld et al. | |
| 2007/0192143 A1 | 8/2007 | Krishnan et al. | |
| 2007/0192724 A1 | 8/2007 | Devore et al. | |
| 2007/0219972 A1 | 9/2007 | Cragun et al. | |
| 2007/0250466 A1 | 10/2007 | Imrapur et al. | |
| 2007/0255574 A1 | 11/2007 | Polo-Malouvier et al. | |
| 2007/0255681 A1 | 11/2007 | Tien et al. | |
| 2007/0282673 A1 | 12/2007 | Nagpal et al. | |
| 2008/0086716 A1* | 4/2008 | Devore et al. | 717/102 |
| 2008/0133568 A1* | 6/2008 | Grosset et al. | 707/102 |
| 2008/0133582 A1 | 6/2008 | Andersch et al. | |
| 2008/0175478 A1 | 7/2008 | Wentland et al. | |
| 2008/0248875 A1 | 10/2008 | Beatty | |
| 2008/0294996 A1 | 11/2008 | Hunt et al. | |
| 2009/0006455 A1 | 1/2009 | Carroll | |
| 2009/0055467 A1 | 2/2009 | Petersen | |
| 2009/0259501 A1 | 10/2009 | Poissant | |
| 2009/0300533 A1 | 12/2009 | Williamson | |
| 2010/0057684 A1 | 3/2010 | Williamson | |
| 2010/0057756 A1 | 3/2010 | Williamson | |
| 2010/0125813 A1 | 5/2010 | Choudhury | |
| 2010/0138449 A1 | 6/2010 | Williamson | |
| 2010/0332583 A1* | 12/2010 | Szabo | 709/202 |

OTHER PUBLICATIONS

Red Hat Notice of Allowance for U.S. Appl. No. 12/074,035, mailed May 24, 2010.
Red Hat Office Action for U.S. Appl. No. 12/202,087, mailed Mar. 15, 2011.
Red Hat Office Action for U.S. Appl. No. 12/202,085, mailed Jan. 3, 2011.
Red Hat Office Action for U.S. Appl. No. 12/156,309, mailed on Jun. 23, 2011.
Red Hat Office Action for U.S. Appl. No. 12/202,087, mailed on Aug. 31, 2011.
Red Hat Office Action for U.S. Appl. No. 12/202,085, mailed on Jul. 18, 2011.
Red Hat Notice of Allowance for U.S. Appl. No. 12/202,085, mailed on Sep. 27, 2011.
Red Hat Office Action for U.S. Appl. No. 12/325,235, mailed on Sep. 22, 2011.
Microsoft SQL Server 2005, "Mining SQL Server 2005 Data Mining Add-Ins for Office 2007," 2007, 11 pages, accessed onlne at <http://www.sqlserverdatamining.com/ssdm/Home/DataMiningAddinsLaunch/tabid/69/Default.aspx> on Sep. 22, 2011.

* cited by examiner

BUILDING CUSTOM DIMENSION TREES

RELATED APPLICATIONS

This application is related to U.S. patent application Ser. No. 12/074,035, filed on Feb. 29, 2008, Ser. No. 12/156,309, filed on May 31, 2008, U.S. patent application Ser. No. 12/202,087, entitled "Creating Reports Using Dimension Trees" filed on Aug. 29, 2008, and U.S. patent application Ser. No. 12/202,085, entitled "Real Time Datamining" filed on Aug. 29, 2008, U.S. patent application Ser. No. 12/325,235, entitled "Forests of Dimension Trees" filed on Nov. 30, 2008 and assigned to the assignee of the present application and hereby incorporated by reference.

TECHNICAL FIELD

Embodiments of the present invention relate to data reporting, and more specifically, to building custom dimension trees.

BACKGROUND

Data stored in a database is usually transactional in nature. A database may be a transactional database or a relational database. Transactional databases simply are a collection of transaction tables Relational databases add the capacity to match tables together and perform other functions. Since relational databases provide ways to match and organize data, more insight can be achieved through them. Hence, most databases systems by default are relational (encompassing the transactional as well as relational capacity). These databases are intended to contain data in a format that will allow it to be completely matchable with other data in the database or other outside databases. However, this data is not organized in a manner where the natural relationships become apparent or easily utilized. Rather, the relationships in the data are defined and maintained by the application running on top of the database. An individual can only see the relationships in the data if he or she already has an understanding of the database structure and the application functionality.

BRIEF DESCRIPTION OF THE DRAWINGS

The present invention is illustrated by way of example, and not by way of limitation, in the figures of the accompanying drawings and in which.

DETAILED DESCRIPTION

Figure 1:
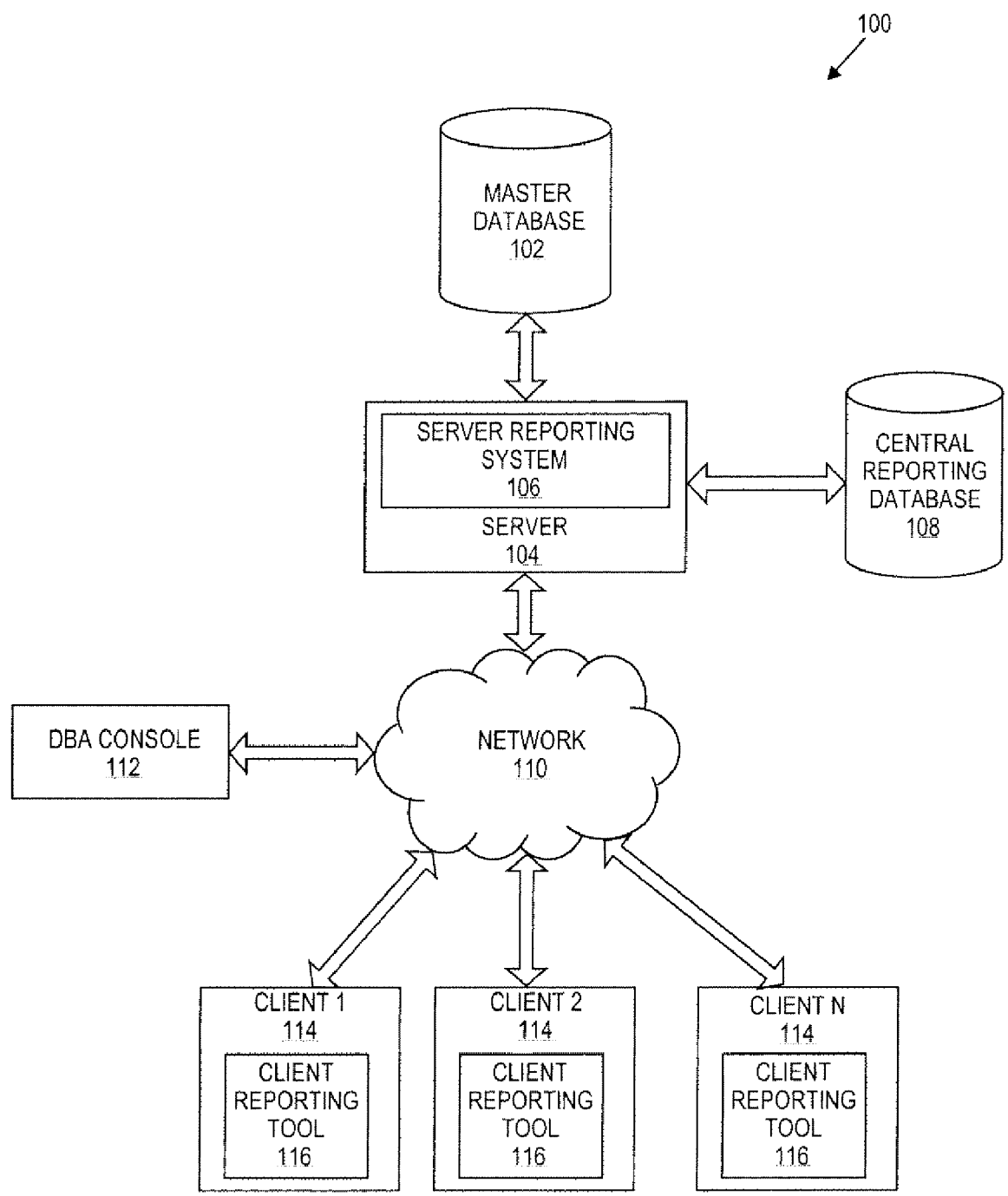
FIG. 1 illustrates a network architecture in which embodiments of the present invention may be implemented.

Described herein is a method and apparatus for creating custom dimension trees. In one embodiment, upon receiving a user request to create a custom dimension tree, a user interface is provided that presents a list of available dimensions associated with one or more source databases, and facilitates user selection of available dimensions from the list. Available dimensions are created by a database administrator (DBA) based on specific fields (e.g., column names) in a source database. In particular, each available dimension corresponds to a field from a source database.

When the user selects two or more of the available dimensions, the user interface displays data elements of the selected dimensions, allows the user to create virtual dimensions, and receives user input specifying mapping of the data elements to the virtual dimensions. A virtual dimension corresponds to a specific attribute of data elements and allows for additional classification of the data elements.

Based on the mapping between the data elements and the virtual dimensions, a custom dimension tree is created representing the relationships between the virtual dimensions. Subsequently, the user can use the custom dimension tree to build a report.

One advantage of the embodiments described herein is that they simplify the creation of reports for end users by providing dimension trees that capture the natural relationships of data. The end users are allowed to build custom dimension trees that reflect data relationships that are the most appropriate for the report being created.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "sending", "receiving", "comparing", "hashing", "maintaining", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more a specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

FIG. 1 illustrates an exemplary network architecture 100 in which embodiments of the present invention may operate. The network architecture 100 may include client devices (clients) 114, a server 104, a DBA console 112, and a network 110. The clients 114 may be, for example, personal computers (PCs), mobile phones, palm-sized computing devices, personal digital assistants (PDAs), and the like.

The server 104 may be, for example, a server computer, a PC, or any other machine. The server 104 may be coupled to the clients 114 via the network 110, which may be a public network (e.g., Internet) or a private network (e.g., Ethernet, a Local Area Network (LAN), or a corporate intranet). In addition, the server 104 may be coupled to a console 112 via the network 110. The console 112 may be operated by a DBA and may be, for example, a PC, a PDA, a mobile phone, etc. The console 112 may contain hardware components and software components including a browser application to render data provided by the server 104.

The server 104 may be coupled to a master database 102 which may reside on one or more storage devices. The server 104 may access the master database 102 directly or via a network (e.g., a private or public network). The master database 102 may represent one or more production databases of an organization or multiple organizations. A production database may be a large relational or transactional database.

The server 104 may host a reporting system 106 that transforms data from the master database 102 to be more suitable for analysis and reporting and stores the transformed data in a central reporting database 108. The central reporting database 108 may reside on one or more storage devices and may be accessible to the server reporting system 106 via a network (private or public network) or directly. The server reporting system 106 provides graphical user interfaces (GUIs) to assist a DBA operating the console 112 in populating the central reporting database 108.

The central reporting database 108 is populated using natural relationships of data stored in the master database 102 and the joining power inherent in the relational features of the master database 102. In particular, the central reporting database 108 is populated using dimensions and dimension trees. Dimensions are defined from data fields of the master database 102. Dimensions can then be organized into dimension trees. A dimension tree combines individual dimensions that are related to each other (e.g., dimensions "year," "month" and "day" may be combined into a tree "date"). In addition, a dimension tree may combine individual dimensions with some other dimension trees (e.g., a dimension tree "date" may be combined with dimensions "hour," "minute" and "second" into a dimension tree "date/time"). A constituent dimension tree added to a main dimension tree is referred to herein as a sub-tree.

In one embodiment, the central reporting database 108 defines the relationships between the dimension trees using a pyramid model, where the top of the pyramid contains only a few dimension tree roots and the base of the pyramid contains the largest number of dimension tree leaves. The central reporting database 108 includes a separate table for each level of the pyramid. As a result, analysis or reporting can start at the top of the pyramid and drill down closer to the base of the pyramid. Alternatively, analysis or reporting can start at any level of the pyramid and move downward.

In one embodiment, the clients 114 host reporting tools 116 that cooperate with the server reporting system 106 to help end users with the creation of reports. In particular, an end user may choose a specific pyramid level, and be presented with dimension trees and dimensions associated with this pyramid level. The user can then select a dimension tree for a report, and be presented with various predefined views of the dimension tree. The views organize dimensions and sub-trees inside a dimension tree in different ways based on multiple relationships a dimension or a sub-tree may have with other constituents of the dimension tree. For example, the tree 'Customer' may be viewed based on systems within an organization that maintain data about customers (e.g., Sugar CRM, Oracle ERP, Datasoft system, etc.). Alternatively, the tree "Customer" may be viewed based on a customer status (e.g., future customer, current customer, inactive customer, et.). The views may be created by a DBA based on common reporting requirements of various users. The user can choose the view that is most suitable for the report being built, select dimensions and sub-trees from the view for relevant components of the report (e.g., title, parameters, column names, row names, etc.), and submit a request to populate the report.

In one embodiment, if the user cannot find a dimension tree or individual dimensions that satisfy his or her reporting needs, the user is allowed to build a custom dimension tree. In particular, the user may be allowed to select specific dimensions from the dimensions or dimension trees created by the DBA, and see data elements of these dimensions. For example, the user may choose the tree "Customer" and select dimensions that represent systems maintaining data about customers (e.g., Sugar CRM dimension, Oracle ERP dimension, and Datasoft system dimension). In response, the user will be presented with the data elements of these dimensions such as the names of the customers (e.g., Abbot, Allied, Anslow, etc.) handled by the above systems. The user can then create virtual dimensions and map the data elements to the virtual dimensions. For example, the user can decide to arrange the companies in alphabetical order by creating virtual dimensions that represent alphabet letters, and mapping company names to corresponding virtual dimensions. As discussed above, a virtual dimension corresponds to a specific attribute of data elements and allows for additional classification of the data elements. In other words, actual dimensions allow to classify source data based on the relationships existing in the source database (e.g., via data division into tables and table columns), and virtual dimensions create new relationships between data of the source database based on additional data attributes not reflected in the format of the source database. In the above example, dimensions "Sugar CRM," "Oracle ERP" and "Datasoft system" have corresponding columns in the source database, while virtual dimensions representing alphabet letters do not correspond to any columns of the source database but rather create new relationships (based on the alphabetical order of customer names) between the data elements of the source database.

The resulting custom tree provides a custom hierarchy of the virtual dimensions, without transforming the source data and its original structure. In addition, custom dimension trees allow new naming conventions and mapping to occur only for individual users, without changing dimensions and dimension trees maintained for the entire user community.

As discussed above, in one embodiment, the client reporting tools 116 cooperate with the server reporting system 106 to provide the above functionality to the end users. In an alternative embodiment, the server reporting system 106 performs all of the above functionality, interacting with web browsers hosted by the clients 114 to receive user input and return requested data. In this alternative embodiment, custom dimension trees are stored in the central reporting database 108 and are provided only to the end users who created these custom trees (owners) or received access to these trees from the owners.

Figure 2A:
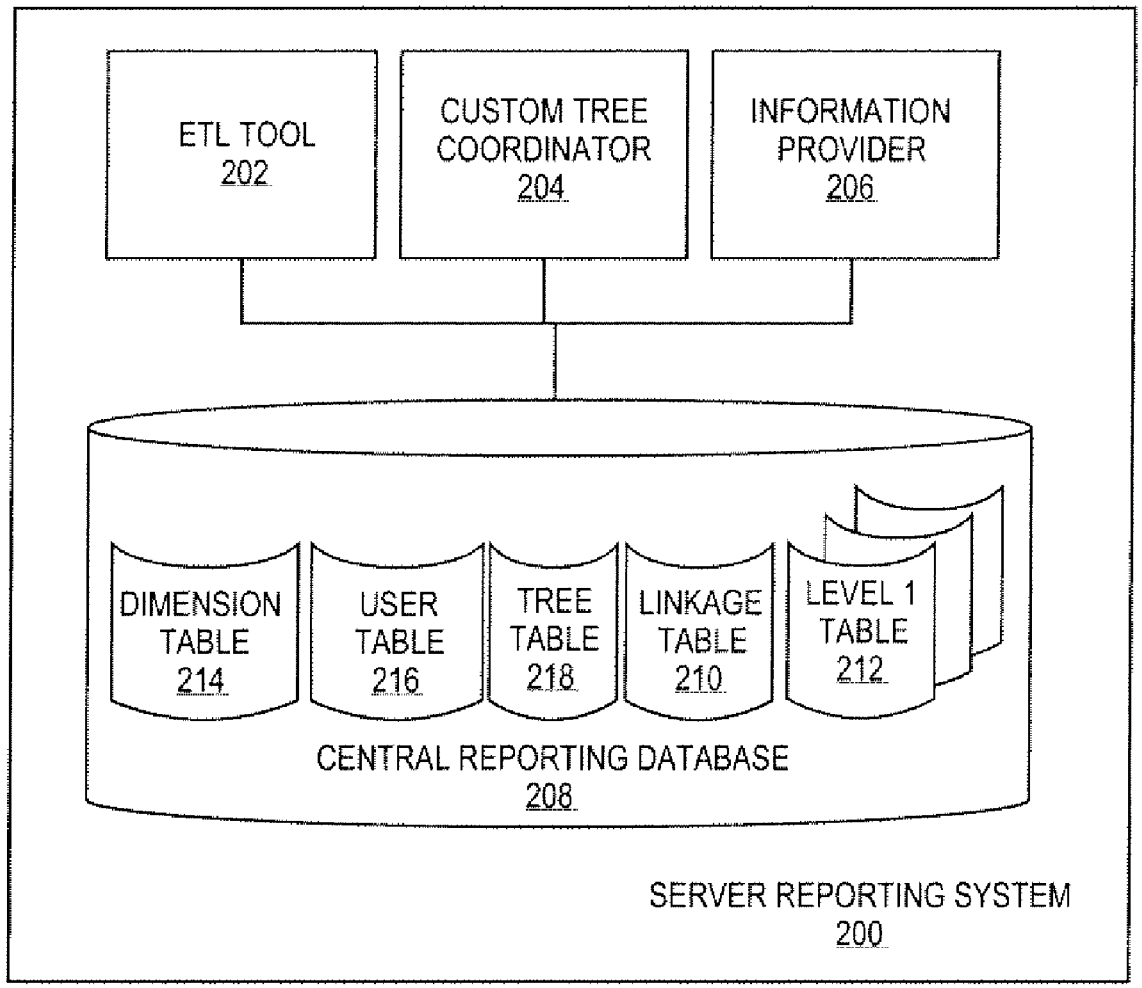
FIG. 2A illustrates a block diagram of one embodiment of a server reporting system.

FIG. 2A is a block diagram of one embodiment of a server reporting system 200. The server reporting system 200 may include an ETL (Extract, Transform, Load) tool 202, a custom tree coordinator 204, an information provider 206, and a central reporting database 208.

The ETL tool 202 transforms data from the master database to be more suitable for analysis and reporting and stores the transformed data in the central reporting database 208. In particular, the ETL tool 202 provides user interfaces that allow a DBA to create dimensions from the production data fields and to define dimension trees based on the created dimensions. Based on the DBA input, the ETL tool 202 populates mapping tables of the central reporting database 208 such as a dimension table 214, a tree table 218, a linkage table 210, and a set of level tables 213. The dimension table 214 specifies dimensions created by the DBA and stores the mappings between the production data fields and the dimensions. The tree table 218 specifies information about dimension trees created by the OBA. This information may include, for example, the name of the dimension tree and identifiers of its constituents (e.g., dimensions, other dimension trees, and/or unique elements). In addition, the tree table 218 may specify views created by the DBA for each dimension tree (eg., the name of the views and corresponding SQL statements). Each level table 212 corresponds to a specific level of the reporting pyramid and lists dimension trees and dimensions associated with this pyramid level. The linkage table 210 stores relationships between the tables 212.

The information provider 206 provides information about dimensions, dimension trees and views to the clients. In particular, the information provider 206 may receive from a client a desired pyramid level for a report being built, and may return a list of dimension trees and/or dimensions associated with the desired pyramid level. Upon receiving information identifying user selection of specific dimensions, the information provider 206 may obtain data elements of the selected dimensions from the master database, and return these data elements to the client. As will be discussed in more detail below, the client presents the selected dimensions and the data elements to the user, and allows the user to build a custom dimension tree. In one embodiment, the custom dimension tree can be shared with other users based on the owner's permission. In this embodiment, the custom tree coordinator 204 receives the custom dimension tree from the client, determines which users can have access to the custom dimension tree, and stores this information in the user table 216. Subsequently, upon receiving a client request concerning the custom dimension tree, the custom tree coordinator 204 accesses the user table 216 to determine whether the custom dimension tree should be made available to the requesting client.

In another embodiment, custom dimension trees are stored locally on the client and are only available to the user of this client.

Figure 2B:
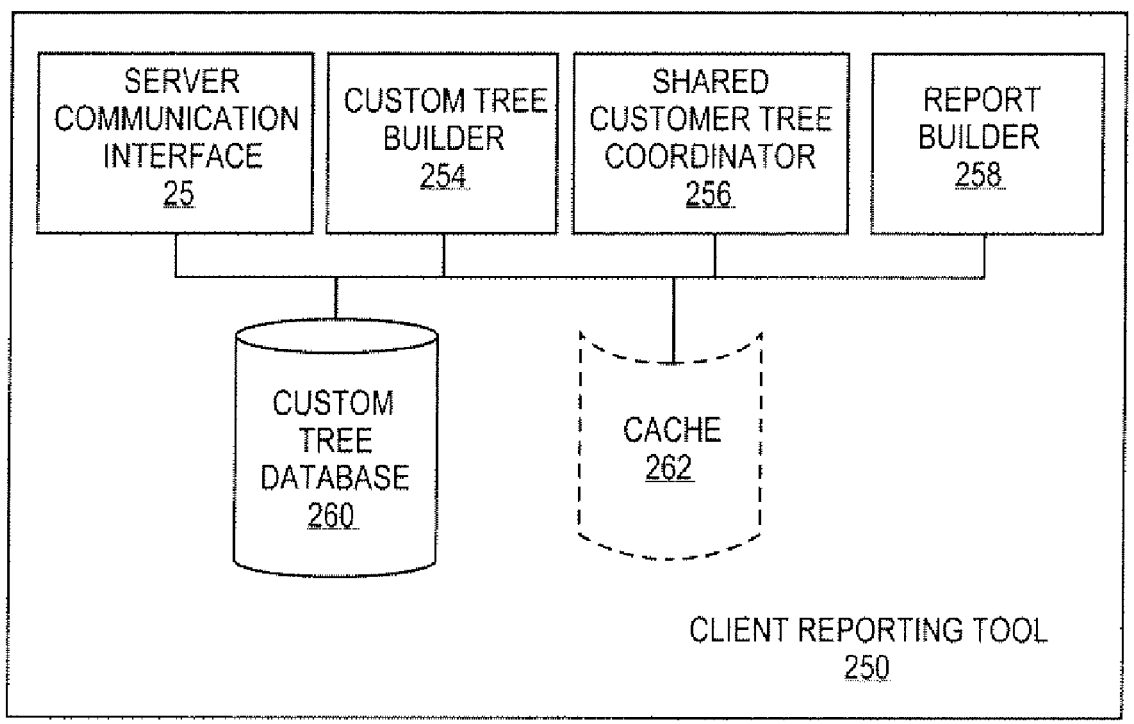
FIG. 2B illustrates a block diagram of one embodiment of a client reporting tool.

FIG. 2B is a block diagram of one embodiment of a client reporting tool 250. The client reporting tool 250 may include a server communication interface 252, a custom tree builder 254, a shared custom tree coordinator 256, a report builder 258, a custom tree database 260, and an optional cache 262.

The server communication interface 252 is responsible for requesting information from the server and receiving the requested information. In particular, the server communication interface 252 may receive from a user a desired pyramid level for a report being built, and request from the server a list of dimension trees and/or dimensions available at the desired pyramid level. When the user selects some dimensions from the list received from the server, the server communication interface 252 may request the server to provide data elements of the selected dimensions. In one embodiment, the server communication interface 252 first checks whether the requested information is stored in the cache 262. If so, the requested information is retrieved from the cache 262. If not, the server communication interface 252 requests this information from the server, and then stores the received information in the cache 262 for future use.

The custom tree builder 254 allows the user to build custom trees. In particular, the custom tree builder 254 provides a user interface that displays data elements received from the server to the user, and allows the user to create virtual dimensions and to map the data elements to the virtual dimensions. Based on this mapping, the custom tree builder 254 creates a custom dimension tree and stores information about the custom dimension tree in the custom tree database 260. Specifically, the custom tree builder 254 may store the name of the custom dimension tree, the names of virtual dimensions, and the mapping between the data elements and the virtual dimensions. The custom tree database 260 may reside on one or more storage devices (e.g., the computer-readable medium described above) that are local to the client and/or remote from the client.

In one embodiment, the user specifies the mapping for each data element. For example, the user can manually specify which virtual dimension each data element should be tied to. Alternatively, the user specifies data element criteria for each virtual dimension, and the custom tree builder 254 then uses these criteria to determine which data elements should be tied to the virtual dimension.

In one embodiment, the user may be allowed to share the custom dimension tree with other users. In this embodiment, the shared customer tree coordinator 256 asks the user to indicate whether this custom dimension tree should be shared with all users or a limited number of users. The shared customer tree coordinator 256 then sends the custom dimension tree and the sharing information to the server.

The report builder 258 allows the user to create a report based on any dimension tree created by the DBA and received from the server, or based on any of the custom dimension trees stored in the custom tree database 260.

Exemplary user interfaces provided by the client reporting tool 250 will be discussed in more detail below in conjunction with FIGS. 4A through 4D and FIG. 5.

Figure 3:
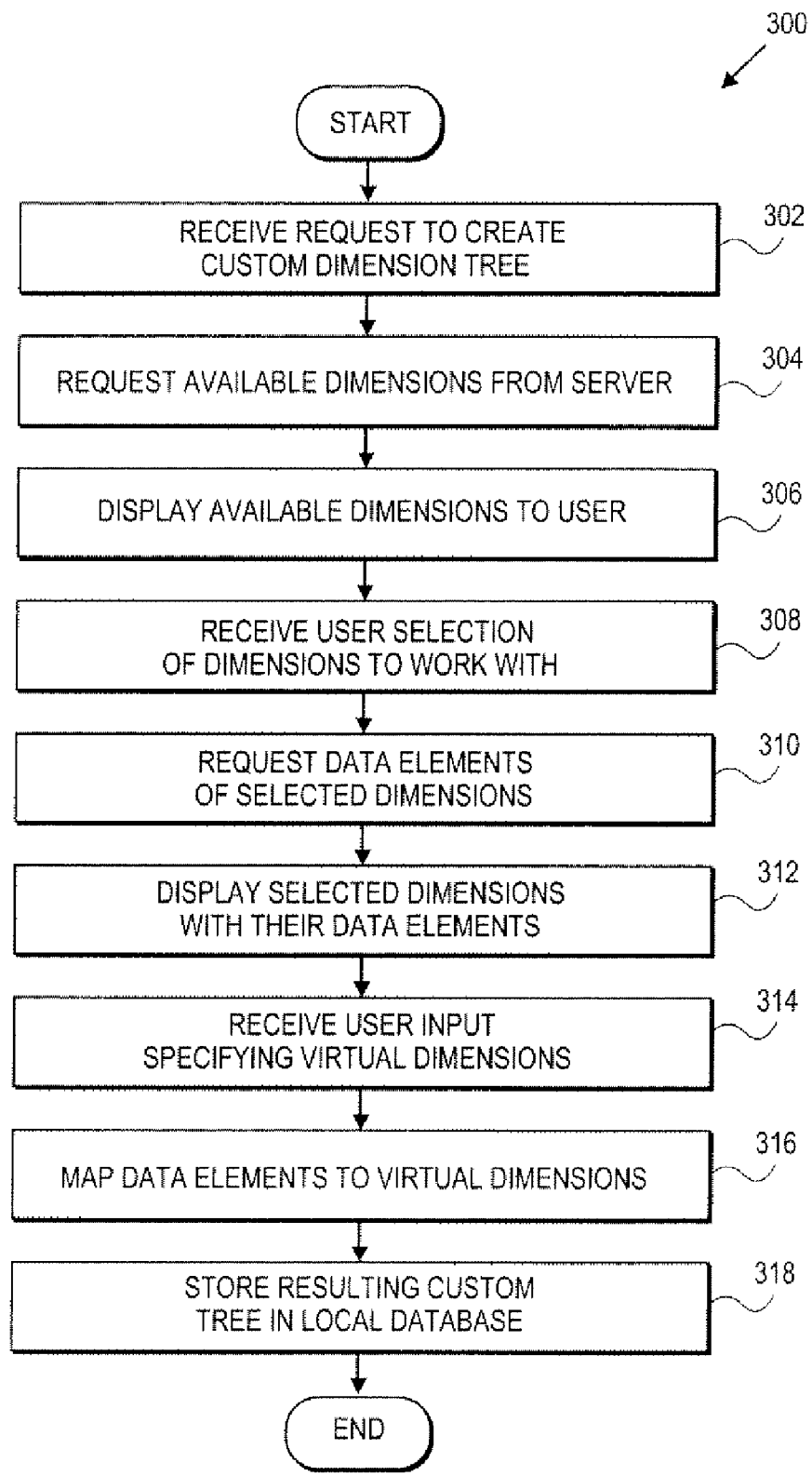
FIG. 3 illustrates a flow diagram of one embodiment of a method for building custom dimension trees.

FIG. 3 illustrates a flow diagram of one embodiment of a method 300 for creating a custom dimension tree. The process 300 may be performed by processing logic that may comprise hardware (e.g., circuitry, dedicated logic, programmable logic, microcode, etc.), software (such as instructions run on a processing device), or a combination thereof. In one embodiment, the process 300 is performed by a dimension client reporting tool 116 of FIG. 1.

Referring to FIG. 3, method 300 begins with processing logic receiving a user request to create a report (block 302). In one embodiment, the request indicates a desired pyramid level for creating the report.

At block 304, processing logic requests available dimensions from the server. In one embodiment, the request asks for dimensions available at the desired pyramid level. The dimensions may include individual dimensions and dimensions inside dimension trees.

At block 306, upon receiving a list of available dimensions from the server, processing logic displays the list of available dimensions to the user. At block 308, processing logic receives user selection of available dimensions from the list. At block 310, processing logic requests data elements of the selected dimensions from the server.

At block 312, processing logic displays the data elements received from the server to the user. At block 314, processing logic receives user input specifying virtual dimensions. At block 316, processing logic maps the data elements to the virtual dimensions. In one embodiment, processing logic maps the data elements to the virtual dimensions based on user input provided for each data element. Alternatively, processing logic maps the data elements to the virtual dimensions based on data element criteria specified by the user for each virtual dimension.

At block 318, processing logic stores the resulting custom tree in a local database. In particular, processing logic may store the name of the custom dimension tree, the names of virtual dimensions, and the mapping between the data elements and the virtual dimensions.

Figure 4A:
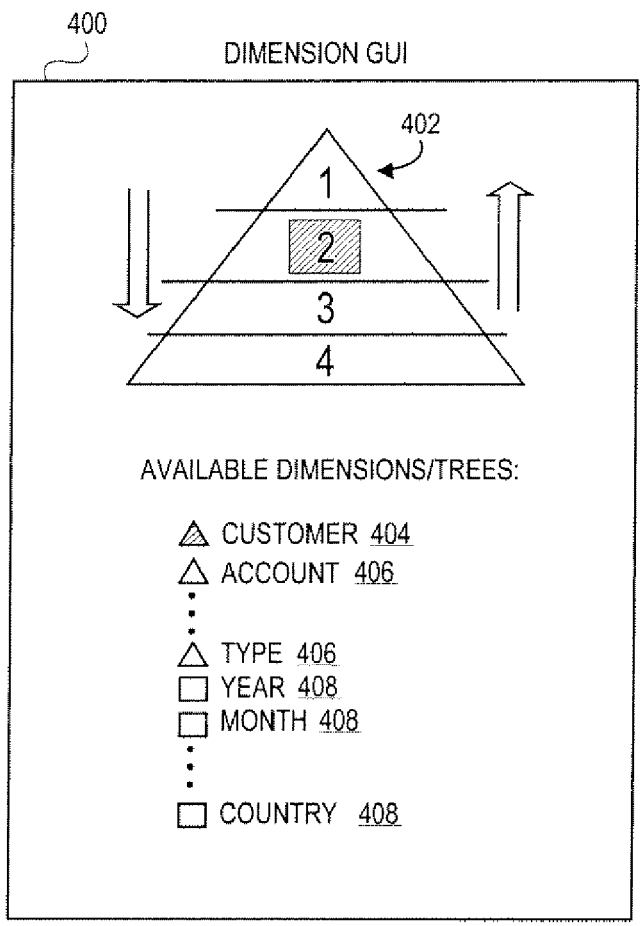
FIGS. 4A through 4D illustrate exemplary user interfaces provided by a client reporting tool to create custom dimension trees, in accordance with one embodiment of the invention.
Figure 4C:
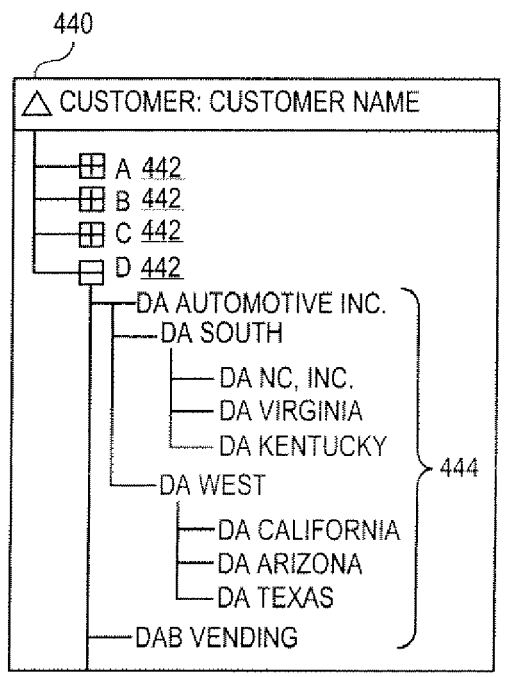

FIGS. 4A through 4D illustrate exemplary user interfaces provided by a client reporting tool to create custom dimension trees, in accordance with one embodiment of the invention. Referring to FIG. 4A, a dimension UI 400 illustrates a reporting pyramid 402 with pyramid level "2" selected by the user. At the selected pyramid level, available dimensions and dimension trees include dimension trees 404 and 406, and dimensions 408. The user selects the tree "Customer" 404 and submits a request to create a custom dimension tree via a designated button or link (not shown). In response, a custom tree builder UI appears.

Figure 4B:
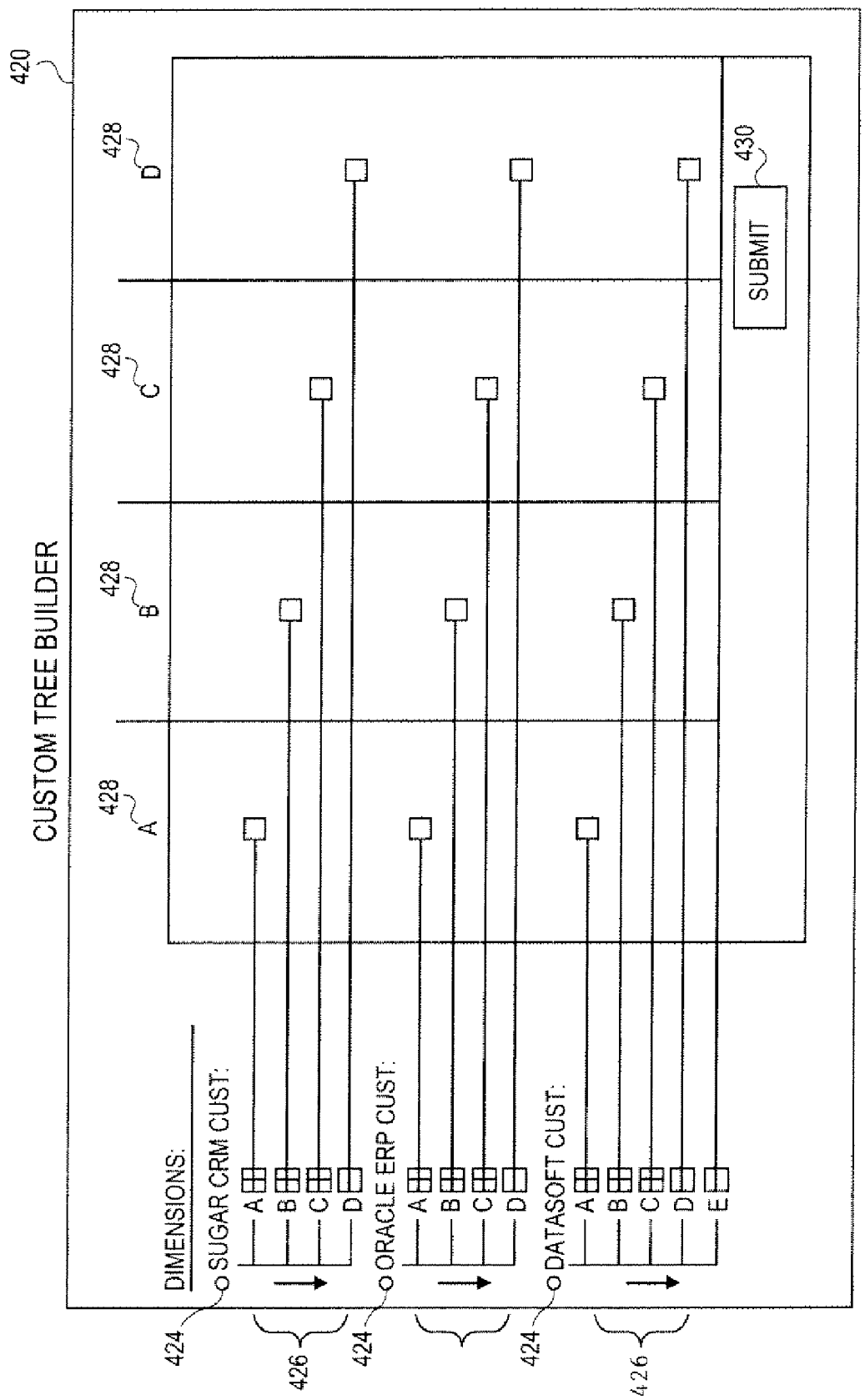

Referring to FIG. 4B, custom tree builder UI 420 shows dimensions 424 from the tree "Customer" and data elements 426 of these dimensions. The dimensions 424 are different systems handling customers within the organization, and the data elements 426 are the names of the customers handled by these systems. The customer tree builder UI 420 allows the user to create virtual dimensions 428 by entering the names of the virtual dimensions. For illustrative purposes, virtual dimensions 428 are shown as alphabet letters to enable classification of data elements 426 based on the alphabetical order. As discussed above, virtual dimensions can be based on any additional attribute of data elements of the source database to create new relationships between the data elements, where these new relationships are not reflected in the format of the source database.

The customer tree builder UI 420 shows the mapping between the data elements 426 and the virtual dimensions 428. The mapping can be manually provided by the user (e.g., via a drag-and-drop operation) or generated automatically based on the mapping criteria specified by the user (e.g., "tie all data elements starting with letter "A" to the virtual dimension "A").

When the building of the custom dimension tree is completed, the user can activate button 430. In response, the user can be asked to provide the name of the new tree (not shown). Next, screen 440 can be presented showing the resulting custom tree as a hierarchy of virtual dimensions 442. In one embodiment, each virtual dimension can be further divided into sub-dimensions based on user mapping. For example, virtual dimension "D" may have a number of sub-dimensions at different levels as illustrated by sub-dimension hierarchy 444.

Figure 4D:
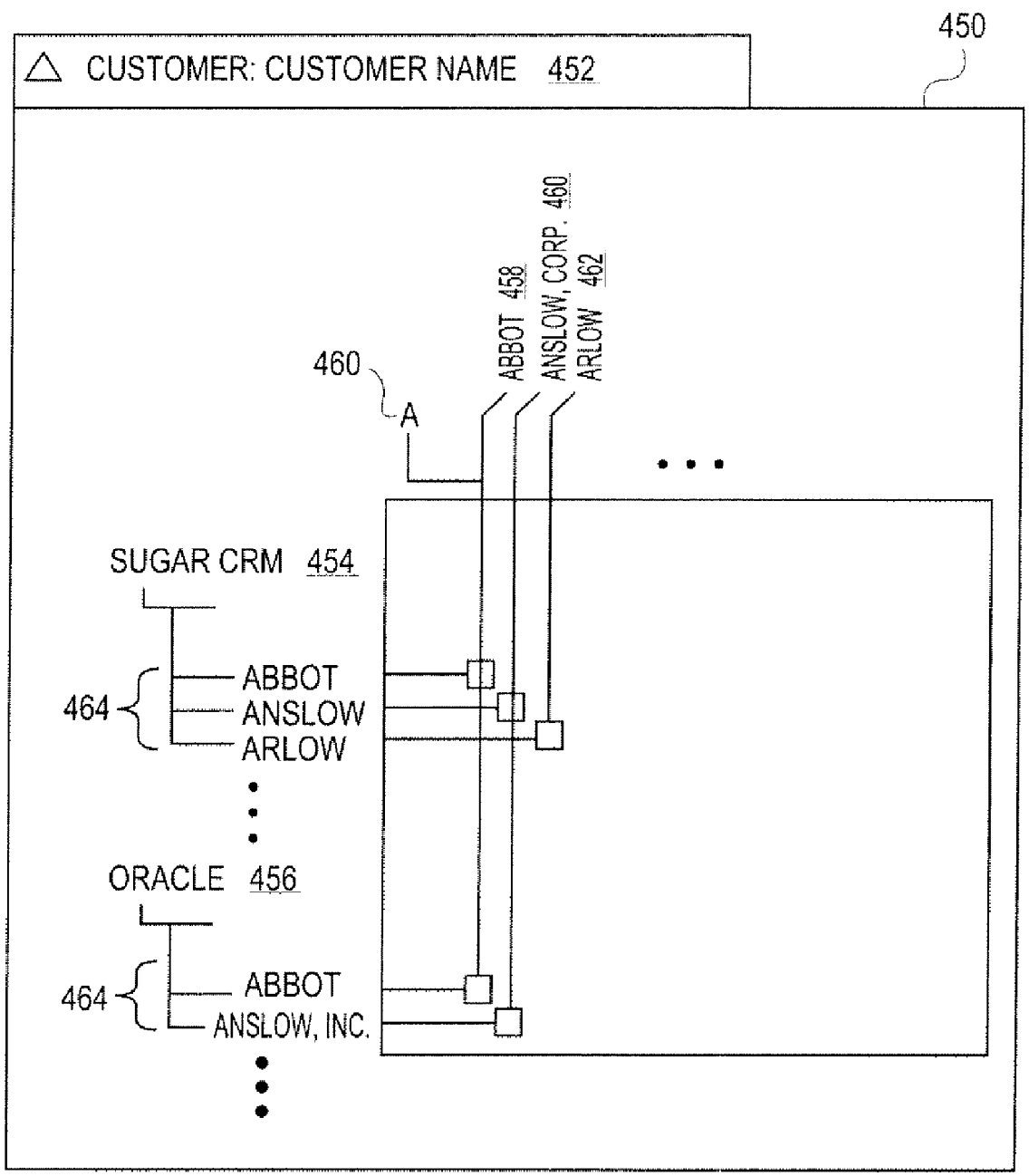

Referring to FIG. 4D, a UI 450 shows the creation of a custom dimension tree 452 using data elements 464 of dimensions 454 and 456. A virtual dimension 460 is created by a user, with sub-dimensions 458, 460 and 462. The data elements 464 are mapped to the sub-dimensions 458, 460 and 462. As shown, the name of the sub-dimension 460 is different from the corresponding data element names, allowing multiple naming conventions.

Figure 5:
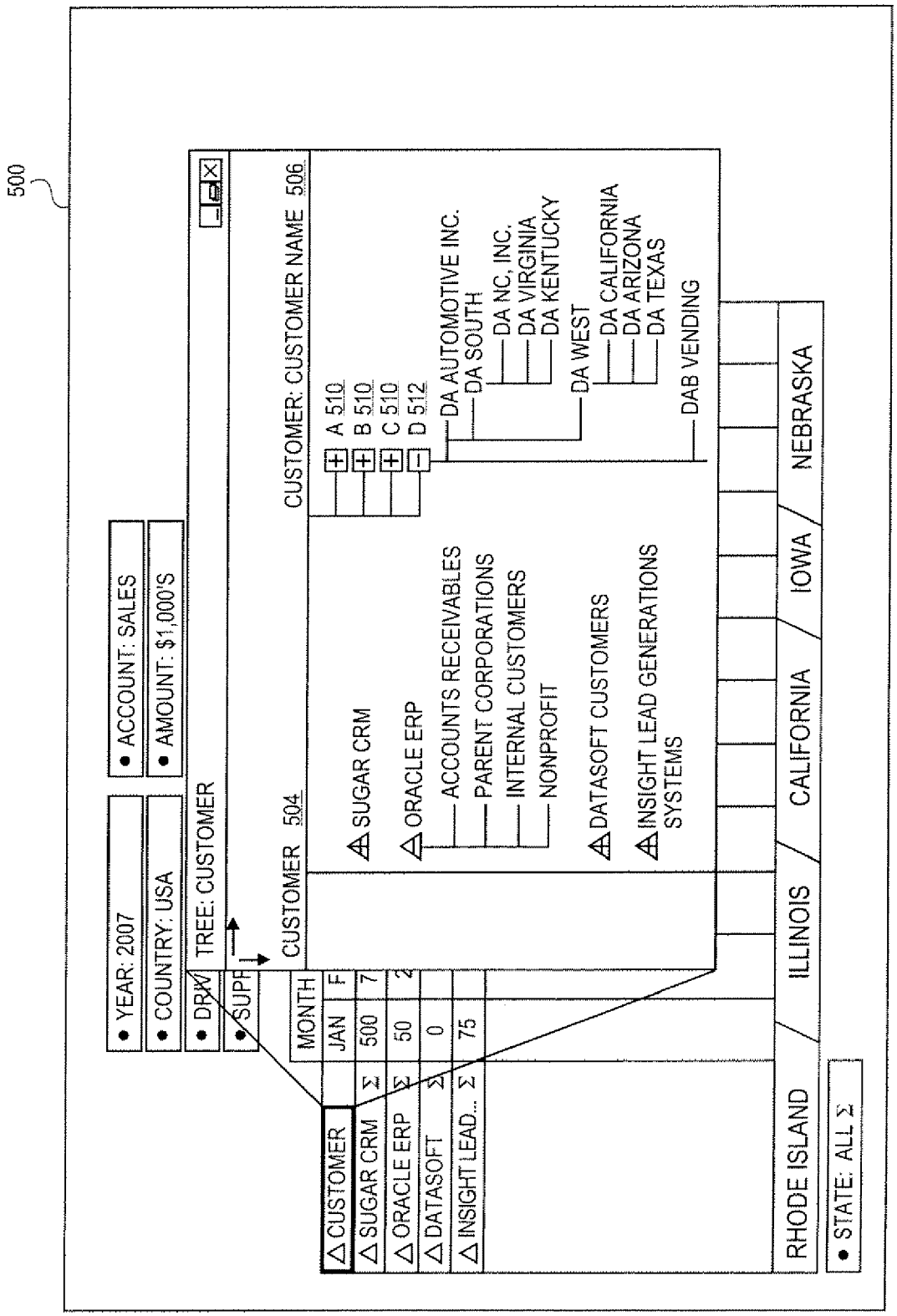
FIG. 5 illustrates an exemplary user interface provided by a client reporting tool to build a report using a custom dimension tree, in accordance with one embodiment of the invention.

FIG. 5 illustrates an exemplary UI 500 provided by a client reporting tool to build a report using a custom dimension tree, in accordance with one embodiment of the invention. The report shown in FIG. 5 was built based on a tree 504 created by a DBA. The user can change the appearance of the report by selecting a custom tree 506 (e.g., via a double-click or a drag-and-drop operation). In response, the rows of the report will be replaced with the virtual dimensions 510 and 512, and the report will be re-populated with data relevant to the virtual dimensions. Alternatively, the user can select a single virtual dimension (e.g., virtual dimension 512) from the custom tree 506, and the report will be re-populated only for this virtual dimension, reflecting the hierarchy inside the virtual dimension 512.

Figure 6:
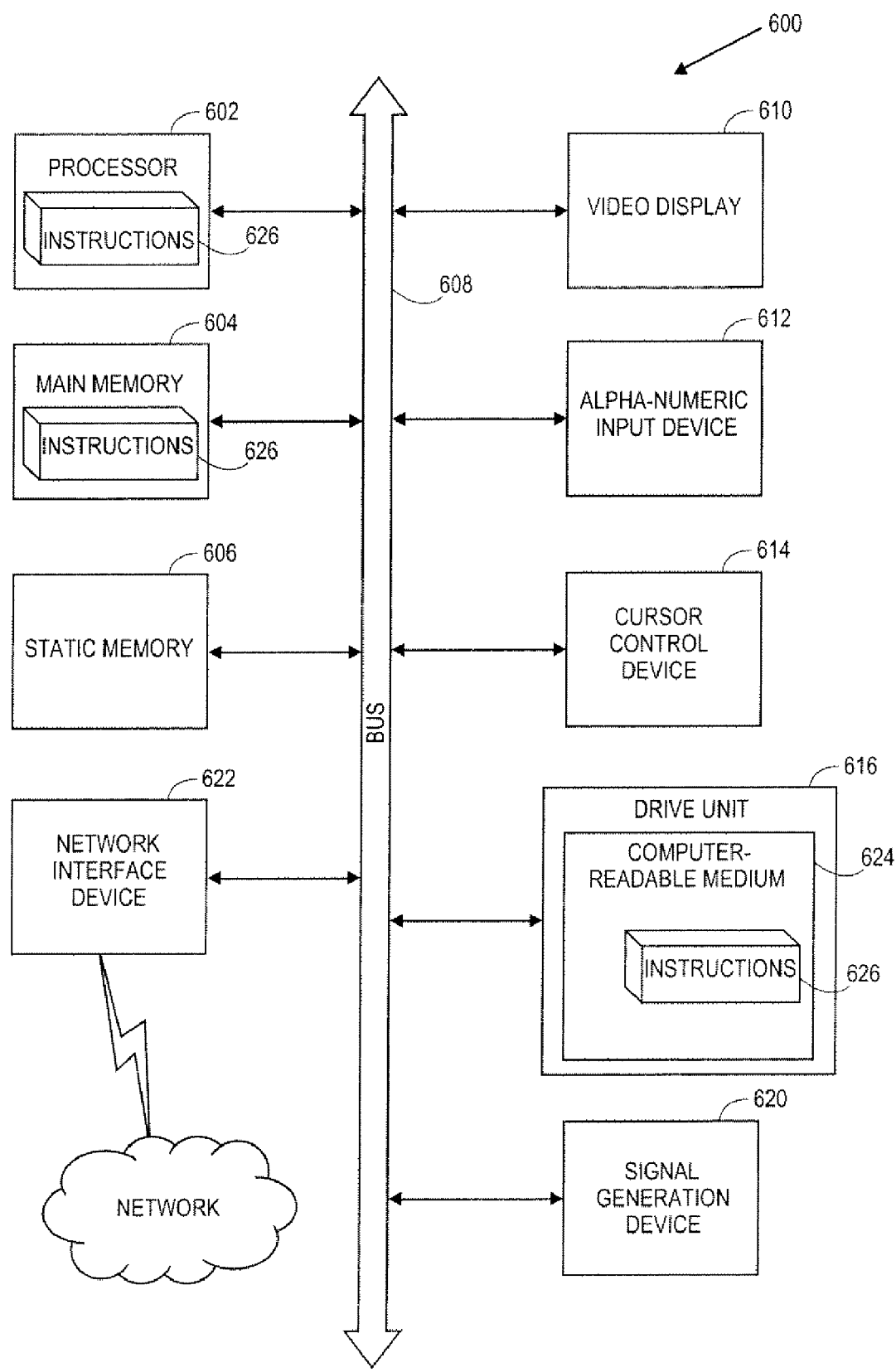
FIG. 6 illustrates a block diagram of an exemplary computer system implementing some embodiments of the present invention.

FIG. 6 illustrates a diagrammatic representation of a machine in the exemplary form of a computer system 600 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a device machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 600 includes a processor 602, a main memory 604 (e.g., read-only memory (ROM), flash memory, dynamic random access memory (DRAM) such as synchronous DRAM (SDRAM) or Rambus DRAM (RDRAM), etc.), a static memory 606 (e.g., flash memory, static random access memory (SRAM), etc.), and a secondary memory 618 (e.g., a data storage device), which communicate with each other via a bus 630.

Processor 602 represents one or more general-purpose processing devices such as a microprocessor, central processing unit, or the like. More particularly, the processor 602 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 602 may also be one or more special-purpose processing devices such as an application specific integrated circuit (ASIC), a field programmable gate array (FPGA), a digital signal processor (DSP), network processor, or the like. Processor 602 is configured to execute the processing logic 626 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The secondary memory 618 may include a machine-readable storage medium (or more specifically a computer-readable storage medium) 631 on which is stored one or more sets of instructions (e.g., software 622) embodying any one or more of the methodologies or functions described herein. The software 622 may also reside, completely or at least partially, within the main memory 604 and/or within the processing device 602 during execution thereof by the computer system 600, the main memory 604 and the processing device 602 also constituting machine-readable storage media. The software 622 may further be transmitted or received over a network 620 via the network interface device 608.

The machine-readable storage medium 631 may also be used to store dimension tree mapping data (e.g., dimension tree database 108 or 208 of FIGS. 1 and 2) While the machine-readable storage medium 631 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present invention. The term "machine-readable storage medium" shall accordingly be taken to include, but not be limited to, solid-state memories, and optical and magnetic media.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A computer-implemented method comprising:
presenting a reporting pyramid and indicators of a plurality of levels of the reporting pyramid, each level of the reporting pyramid being associated with a set of available dimensions corresponding to data attributes reflected in a format of a source database;
receiving, by a server computer system, a request of a first user to create a custom dimension tree, the request indicating a level of the plurality of levels of the reporting pyramid;
displaying a list of available dimensions at the requested level of the reporting pyramid;
receiving user selection of available dimensions from the list;
defining, based on user input, virtual dimensions based on additional data attributes not reflected in the format of the source database;
mapping elements of the available dimensions to the virtual dimensions; and
creating the custom dimension tree using the mapping, the custom dimension tree representing relationships between the virtual dimensions.

2. The method of claim 1 wherein:
the displayed list of available dimensions includes dimensions inside dimension trees associated with the identified level of the reporting pyramid, and individual dimensions associated with the identified level of the reporting pyramid.

3. The method of claim 1 wherein:
the user request identifies an existing dimension tree; and
the displayed list of available dimensions includes dimensions inside the existing dimension tree.

4. The method of claim 1 wherein defining, based on user input, virtual dimensions comprises:
receiving user input specifying names of virtual dimensions; and
storing names of the virtual dimensions in a virtual dimension table.

5. The method of claim 4 wherein mapping elements of the available dimensions to the virtual dimensions comprises:
receiving user input specifying one or more element criteria for each of the virtual dimensions; and
for each of the virtual dimensions, finding elements of the available dimensions that satisfy a corresponding element criteria, and mapping the found elements to a relevant virtual dimension in the virtual dimension table.

6. The method of claim 4 wherein mapping elements of the available dimensions to the virtual dimensions comprises:
for each virtual dimension, receiving user input specifying which elements of the available dimensions are to be associated with a relevant virtual dimension; and
storing associations between the elements and the virtual dimensions based on the user input.

7. The method of claim 4 wherein creating the custom dimension tree comprises:
storing a name of the custom dimension tree with the names of the virtual dimensions in the virtual dimension table.

8. The method of claim 1 wherein the custom dimension tree is available only to the first user.

9. The method of claim 1 wherein the custom dimension tree is available to the first user and to one or more other users authorized by the first user.

10. The method of claim 1 further comprising:
building a report based on the custom dimension tree.

11. A system comprising:
a memory; and
a processor, coupled to the memory, to cause a custom tree builder to present a reporting pyramid and indicators of a plurality of levels of the reporting pyramid, each level of the reporting pyramid being associated with a set of available dimensions corresponding to data attributes reflected in a format of a source database, to receive a request of a first user to create a custom dimension tree, the request indicating a level of the plurality of levels of the reporting pyramid, to display a list of available dimensions at the requested level of the reporting pyramid, to receive user selection of available dimensions from the list, to define based on user input virtual dimensions, the virtual dimensions providing new relationships between data of the source database based on additional data attributes not reflected in the format of the source database, and to map elements of the available dimensions to the virtual dimensions;
wherein the memory hosts a custom tree database, coupled to the custom tree builder, to store the custom dimension tree with mappings between the elements and the virtual dimensions, the custom dimension tree representing relationships between the virtual dimensions.

12. The system of claim 11 wherein:
the displayed list of available dimensions includes dimensions inside dimension trees associated with the identified level of the reporting pyramid, and individual dimensions associated with the identified level of the reporting pyramid.

13. The system of claim 11 wherein:
the user request identifies an existing dimension tree; and
the displayed list of available dimensions includes dimensions inside the existing dimension tree.

14. The system of claim 11 wherein the custom tree builder is to map elements of the available dimensions to the virtual dimensions by:
receiving user input specifying one or more element criteria for each of the virtual dimensions; and
for each of the virtual dimensions, finding elements of the available dimensions that satisfy a corresponding element criteria, and mapping the found elements to a relevant virtual dimension in the virtual dimension table.

15. The system of claim 11 wherein the custom tree builder is to map elements of the available dimensions to the virtual dimensions by:
for each virtual dimension, receiving user input specifying which elements of the available dimensions are to be associated with a relevant virtual dimension; and
storing associations between the elements and the virtual dimensions based on the user input.

16. The system of claim 11 further comprising a shared custom tree coordinator, coupled to the custom tree database, to make the custom dimension tree available to the first user and to one or more other users authorized by the first user.

17. The system of claim 11 further comprising a report builder, coupled to the custom tree database, to build a report based on the custom dimension tree.

18. A non-transitory computer readable storage medium including instructions that, when executed by a processing system, cause the processing system to perform a method comprising:
a reporting pyramid and indicators of a plurality of levels of the reporting pyramid, each level of the reporting pyramid being associated with a set of available dimensions corresponding to data attributes reflected in a format of a source database;
receiving, by a server computer system, a request of a first user to create a custom dimension tree, the request indicating a level of the plurality of levels of the reporting pyramid;
displaying a list of available dimensions at the requested level of the reporting pyramid;
receiving user selection of available dimensions from the list;
defining, based on user input, virtual dimensions based on additional data attributes not reflected in the format of the source database;
mapping elements of the available dimensions to the virtual dimensions; and
creating the custom dimension tree using the mapping, the custom dimension tree representing relationships between the virtual dimensions.

19. The computer readable storage medium of claim 18 wherein:
the displayed list of available dimensions includes dimensions inside dimension trees associated with the identified level of the reporting pyramid, and individual dimensions associated with the identified level of the reporting pyramid.

20. The computer readable storage medium of claim 18 wherein mapping elements of the available dimensions to the virtual dimensions comprises:
receiving user input specifying one or more element criteria for each of the virtual dimensions; and
for each of the virtual dimensions, finding elements of the available dimensions that satisfy a corresponding element criteria, and mapping the found elements to a relevant virtual dimension in the virtual dimension table.

* * * * *